United States Patent
Neerbek et al.

(10) Patent No.: US 11,936,765 B2
(45) Date of Patent: *Mar. 19, 2024

(54) HIGH PRECISION SYNCHRONIZATION IN A SHARED MEDIUM

(71) Applicant: Roku, Inc., San Jose, CA (US)

(72) Inventors: Jan Neerbek, Aarhus (DK); Bjorn Reese, Aarhus (DK); Brian Moller, Aalborg (DK)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,368

(22) Filed: Jun. 24, 2022

(65) Prior Publication Data

US 2022/0329403 A1     Oct. 13, 2022

Related U.S. Application Data

(63) Continuation of application No. 16/777,094, filed on Jan. 30, 2020, now Pat. No. 11,405,173.

(51) Int. Cl.
*H04L 7/00* (2006.01)
*H04B 1/713* (2011.01)
(Continued)

(52) U.S. Cl.
CPC ........... *H04L 7/0012* (2013.01); *H04B 1/713* (2013.01); *H04J 3/0661* (2013.01); *H04L 7/0331* (2013.01)

(58) Field of Classification Search
CPC ..... H04B 7/0602; H04B 5/0081; H04W 4/02; H04W 56/00; H04W 4/026;
(Continued)

(56) References Cited

U.S. PATENT DOCUMENTS 10,412,697 B2   9/2019  Chen et al.
10,466,738 B2   11/2019 Sharpe-Geisler
(Continued)

FOREIGN PATENT DOCUMENTS

KR   10-2017-0138513 A   12/2017
KR   10-2018-0023024 A    3/2018
WO   WO 2018/208197 A1   11/2018

OTHER PUBLICATIONS

Lyons, Richard G., Understanding Digital Signal Processing, 3rd Edition, Boston, Pearson Education, Inc., 2011.
(Continued)

*Primary Examiner* — Iqbal Zaidi
(74) *Attorney, Agent, or Firm* — Sterne, Kessler, Goldstein & Fox P.L.L.C.

(57) ABSTRACT

Some embodiments include an apparatus, method, and computer program product for high precision device synchronization of electronic devices in a shared medium. Some embodiments include a first electronic device that utilizes a combination of synchronization techniques to synchronize with a second electronic device. The first electronic device receives a first signal from the second electronic device that includes network-based synchronization data and marker data, and performs network-based synchronization with the second electronic device at a first synchronization accuracy. The first electronic device receives a second signal, and uses the marker data and phase lock synchronization to detect a frequency change of the second signal received, as well as to determine a corresponding time marker. The first electronic device updates a clock of the first electronic device based at least on the corresponding time marker, the network-based synchronization data, and the marker data.

19 Claims, 8 Drawing Sheets

(51) Int. Cl.
  *H04J 3/06* (2006.01)
  *H04L 7/033* (2006.01)
(58) Field of Classification Search
  CPC ............. H04W 56/0065; H04W 4/008; H04W 72/082; H04L 29/08; H04L 45/3065; H04L 7/081
  See application file for complete search history.

(56) References Cited

U.S. PATENT DOCUMENTS

| | | | |
|---|---|---|---|
| 11,405,173 | B2 | 8/2022 | Neerbek et al. |
| 2018/0205477 | A1 | 7/2018 | Yang et al. |
| 2019/0089472 | A1* | 3/2019 | Zhang ................ H04N 21/8547 |
| 2019/0379475 | A1 | 12/2019 | Seethamraju |
| 2021/0006344 | A1* | 1/2021 | Chen ........................ G01S 19/14 |
| 2021/0112106 | A1* | 4/2021 | McKenzie ................ G06F 1/12 |
| 2021/0243003 | A1 | 8/2021 | Neerbek et al. |

OTHER PUBLICATIONS

Liu, et al., "Design Phase Locked Loop Accuracy towards Femtosecond Magnitude," 4th International Symposium on Electrical & Electronics Engineering, May 2015.
"Network Time Protocol," Wikipedia.org, accessible at https://en.wikipedia.org/wiki/Network_Time_Protocol (last accessed Mar. 4, 2020).
Stevanovic, S. et al., "A GPS Phase-Locked Loop Performance Metric Based on the Phase Discriminator Output," Sensors, vol. 18, No. 1 (Jan. 19, 2018); pp. 296-318.
"Phase Locked Loop (PLL) in a Software Defined Radio (SDR)," Wireless Pi, accessible at https://wirelesspi.com/phase-locked-loop-pll-in-a-software-defined-radio-sdr/ (Feb. 24, 2020).
"Simple Phase Locked Loop," codereview.stackexchange.com, accessible at https://codereview.stackexchange.com/questions/120747/simple-phase-locked-loop (Feb. 22, 2016).
Lutus, P., "Understanding Phase-Locked Loops," arachnoid.com, accessible at https://arachnoid.com/phase_locked_loop/ (2011).
Von Nagy, Andrew, "Understanding Wi-Fi Carrier Sense," Revolution Wi-Fi, accessible at http://www.revolutionwifi.net/revolutionwifi/2011/03/understanding-wi-fi-carrier-sense.html (Mar. 7, 2011).
Dacus, et al., "Introducing Loop Antennas For Short-Range Radios," Radio Systems, Jul. 2002; pp. 80-88.
Dacus, Farron, "Design and Optimization of Frequency Modulated Phase Locked Loops," RF Synthesizers, Mar. 1992; pp. 114-119.
Dacus, et al., "Constructing Circuits For Short-Range Radios," Microwaves & RF, Feb. 2002; pp. 59-74.
Dacus, et al., "Introductory System Design of the Advanced Subminiature Telemetry System," International Telemetry Conference, 2000.
Dacus, Farron, "Understanding Regulations For Short-Range Radios," Microwaves & RF, Oct. 2001; pp. 79-96.
Dacus, Farron, "Design Of Short-Range Radio Systems," Microwaves & RF, Sep. 2001; pp. 73-80.
Dacus, et al., "Tracking Phase Noise In Short-Range Radios," Microwaves & RF, Mar. 2002; pp. 1-9.
Van Niekerk, et al., "Matching Loop Antennas To Short-Range Radios," Microwaves & RF, Aug. 2002; pp. 72-84.
Dacus, et al., "Suggested ISO Battery Supported UHF RFID Standard Improvements and Roadmap," Maxim Integrated Products, Oct. 11, 2007.
Dacus, Farron, "Design Methods of Modern Ultra-Low-Noise Synthesizers," MWRF.com, Jan. 2019.
Dacus, Farron, "Design Methods of Modern Ultra-Low-Noise Synthesizers," Longwing Technology, Dec. 2018.
Dacus, Farron, "Design Methods of Modern Ultra-Low-Noise Synthesizers," Microwaves & RF, Dec. 2018; pp. 36-42.
Dacus, Farron, "Low-Noise Synthesizer Design Examples," Microwaves & RF, Dec. 2019; pp. 28-38.
Dacus, Farron, "Low-Noise Synthesizer Design Examples," Longwing Technology, Dec. 2019.
Dacus, Farron, "Key Parts for Ultra-Low Noise Synthesizer Design," Longwing Technology, Oct. 2019.
Dacus, Farron, "Key Parts for Ultra-Low Noise Synthesizer Design," MWRF.com, Oct. 2019.
Dacus, Farron, "Noise Sources in Ultra-Low-Noise Synthesizer Design," Microwaves and RF, Feb. 2019; pp. 42-45.
Dacus, Farron, "Noise Sources in Ultra-Low Noise Synthesizer Design," Longwing Technology, Feb. 2019.
Dacus, Farron, "Noise Sources in Ultra-Low-Noise-Synthesizer Design," MWRF.com, Feb. 2019.
Dacus, Farron, "Noise and its Shaping in Ultra-Low Noise Synthesizer Design," MWRF.com, Mar. 2019.
Dacus, Farron, "Noise and its Shaping in Ultra-Low-Noise Synthesizer Design," Microwaves & RF, Mar. 2019; pp. 72-75.
Dacus, Farron, "Noise and its Shaping in Ultra-Low-Noise Synthesizer Design," Longwing Technology, Mar. 2019.
International Search Report and Written Opinion directed to related International Patent Application No. PCT/US2020/058885, dated Feb. 22, 2021; 7 pages.
International Preliminary Report on Patentability directed to related International Patent Application No. PCT/US2020/058885, dated Jul. 28, 2022; 5 pages.

\* cited by examiner

HIGH PRECISION SYNCHRONIZATION IN A SHARED MEDIUM

CROSS-REFERENCE TO RELATED APPLICATIONS

This application is a continuation application of U.S. patent application Ser. No. 16/777,094, filed on Jan. 30, 2020, entitled, Receiver for High Precision Synchronization in a Shared Medium, which is incorporated herein by reference in its entirety.

BACKGROUND

Field

The described embodiments relate generally to wireless communication, including synchronization among wireless electronic devices.

Related Art

Electronic devices utilizing wireless communications synchronize via packets transmitted between devices. Estimates of round trip times between devices are used to determine the range of time synchronization errors. The accuracy of such approaches is limited by a number of real-world influences such as the speed and accuracy of wireless components as well as the traffic and noise on a wireless medium.

SUMMARY

Some embodiments include an apparatus, method, and computer program product for high precision device synchronization of electronic devices in a shared medium. In an example, a first electronic device (e.g., a slave device) synchronizes with a second electronic device (e.g., a master device) using a combination of synchronization methods. For example, the first electronic device may synchronize with the second electronic device using a network-based synchronization method with a first synchronization. After receiving marker data from the second electronic device, the first electronic device may use the marker data in conjunction with the network-based synchronization and a second synchronization method to obtain a higher precision synchronization with the second electronic device than the first synchronization. In some embodiments the first synchronization is in the order of milliseconds and the higher precision synchronization is in the order of hundreds of femtoseconds.

In some embodiments the first electronic device can receive a first signal from the second electronic device that includes: a network-based time stamp, a corresponding accuracy of the network-based time stamp, and marker data. The first electronic device can perform network-based synchronization with the second electronic device based on the network-based time stamp, and the corresponding accuracy, to synchronize a clock of the first electronic device to a clock of the second electronic device within the corresponding accuracy. The first electronic device can receive a second signal at a first frequency, and detect a frequency change of the second signal that is based on the marker data, where the frequency change of the second signal identifies a first time marker. The first electronic device can determine a relative accuracy based at least on the first time marker, the marker data, the network-based time stamp, and the corresponding accuracy, and can update the clock of the first electronic device based at least on the relative accuracy.

In some embodiments, the marker data includes a rate of frequency change represented as $x + \alpha \cdot m \cdot \delta_t$, where $x$ is the network-based time stamp, $\delta_t$ is the corresponding accuracy, $\alpha$ is a settable value greater than 2, and m is an integer.

3. In some embodiments, the first time marker is a time, t, where the clock of the first electronic device indicates $t = x + \alpha \cdot m \cdot \delta_t + \delta_x$, where $\delta_x$ is the relative accuracy, and $-\delta_t < \delta_x < \delta_t$. In addition, at the first time marker, the clock of the second electronic device indicates that $t = x + \alpha \cdot m \cdot \delta_t$, for some value of m. Using these relationships the value of m can be determined to synchronize the first electronic device with the second electronic device at a higher precision synchronization than the network-based synchronization alone.

In some embodiments the shared medium is wave-based. In some embodiments, the first electronic device includes a phase lock loop (PLL) circuit to detect the frequency change of the second signal. The PLL circuit performs PLL synchronization based on a frequency change, amplitude change, or a presence change of the second signal. The rate of frequency change can be based on frequency hopping, for example.

In some embodiments the marker data includes a known number of wave pulses, m, of the second signal, to detect the frequency change of the second signal. Subsequent to updating the clock of the first electronic device, the first electronic device can count a number of wave pulses of the second signal received; determine that the count satisfies m; determine a second time marker corresponding to the m count is satisfied; and then update the clock of the first electronic device based at least on the second time marker.

In some embodiments the first signal includes: a WiFi signal, a radio frequency (RF) signal, an infrared (IR) frequency signal, a sound signal, or a light signal. In some examples, the first signal includes a WiFi synchronization beacon signal. In some embodiments, the first signal is of a different type of signal than the second signal. In some embodiments, the first signal is of a same type as the second signal.

In some embodiments the first electronic device can implement a machine learning algorithm to detect the frequency change of the second signal, where the machine learning algorithm includes a convolutional neural network (CNN) or long short-term memory network (LSTM).

In some embodiments the first electronic device can be configured to use a subsequent frequency change as a heartbeat for the clock of the first electronic device. In some examples, the first electronic device can use network time protocol (NTP), hypertext transfer protocol (HTTP), or a proprietary protocol to receive the wireless communications.

In some embodiments, the second electronic device (e.g., a master device) can transmit a first signal over a shared medium, wherein the first signal includes network synchronization data and marker data, and transmit a second signal on a base frequency. The second electronic device can perform network-based synchronization with a first electronic device (e.g., a slave device), wherein a clock of the first electronic device is updated based on the network synchronization data. The second electronic device can determine that the marker data is satisfied at a time marker, and based on the determination, transmit the second signal on an excited frequency, where the excited frequency is different than the base frequency, where the second electronic device detects the frequency change of the second signal, and updates the clock of the first electronic device based on: the frequency change detected, the network synchronization data, and the marker data.

In some embodiments, the network synchronization data includes: a network-based time stamp, x, and a corresponding accuracy of the network-based time stamp, $δ_t$, where the marker data includes: a rate of frequency change of the second signal. The rate of frequency change of the second signal can be represented as the following: $x+\propto \cdot m \cdot δ_t$, where $\propto$ is a settable value greater than 2, and m is an integer. In some embodiments, the second electronic device can determine that m is not an odd value, change the frequency of the second signal to the excited frequency, and increment m. The second electronic device may also determine that m is an odd value, change the frequency of the second signal to the base frequency, and increment m.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
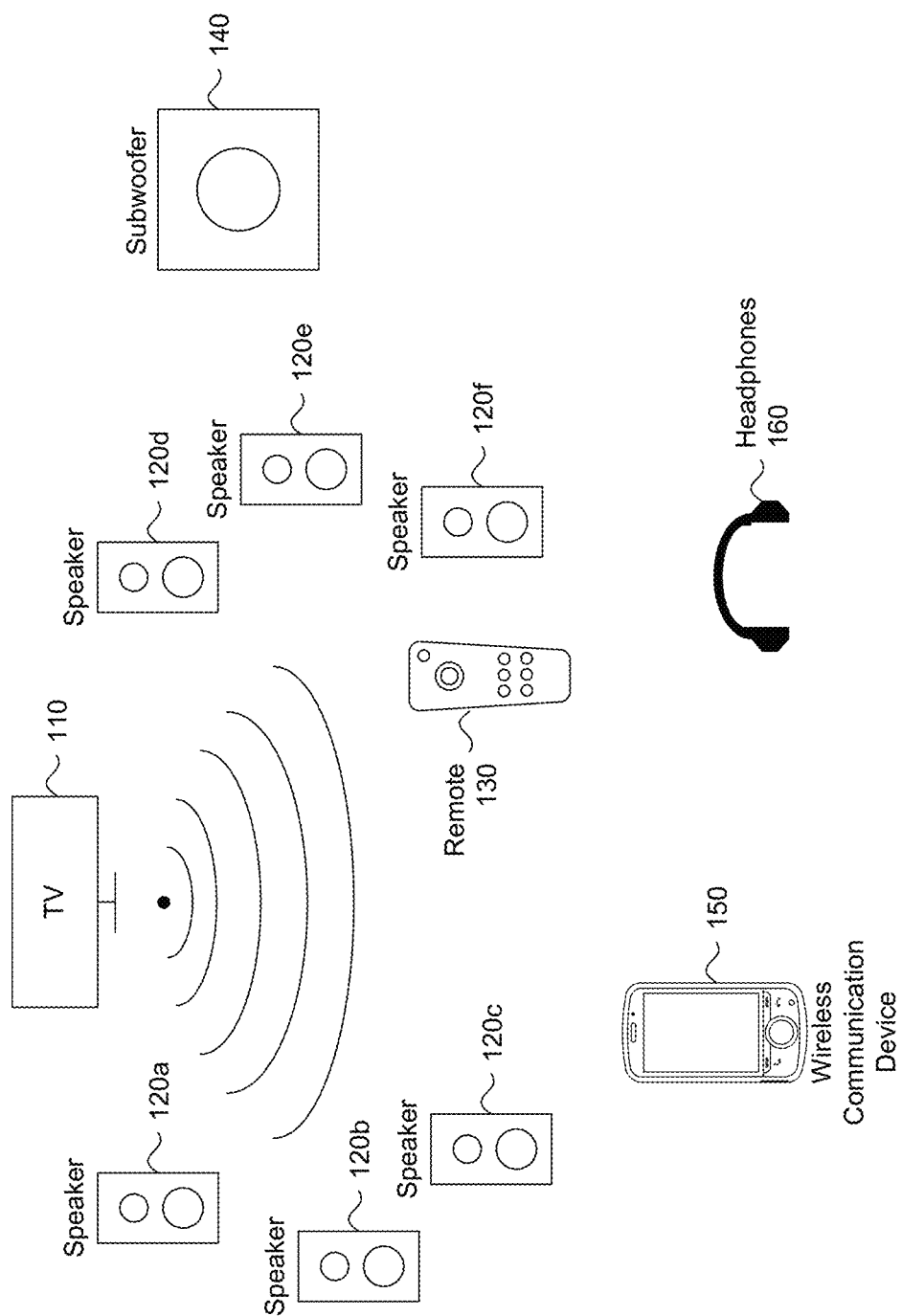
FIG. 1 illustrates an example system implementing transmitters receivers for high precision synchronization in a shared medium, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments utilize a combination of synchronization methods to obtain high precision synchronization among electronic devices of a shared medium. Examples of a shared medium include wave-based mediums including but not limited to radio frequency (RF), infrared (IR), WiFi, light, and sound media. Some embodiments include a first electronic device (e.g., a slave device) that utilizes a combination of synchronization techniques to synchronize with a second electronic device (e.g., a master device). The first electronic device can receive a first signal from the second electronic device that includes network-based synchronization data and marker data, and perform network-based synchronization with the second electronic device. The first electronic device can receive a second signal at first frequency, and then detect a frequency change of the second signal using a second synchronization method, where the frequency change is based on the marker data. The time at which the frequency change occurs indicates a time marker. The first electronic device can use the time marker, the marker data, and the network-based synchronization data to determine a higher precision synchronization with the second electronic device, than the network-based synchronization.

For example, the second electronic device can transmit the following wireless communications to the first electronic device: i) network-synchronization information of a shared medium; ii) marker data; and iii) a second signal whose frequency changes based on the marker data. The first electronic device can receive communications i), ii), and iii) and perform high precision synchronization with the second electronic device. In addition, other electronic devices on the shared medium that receive communications i), ii), and iii) can also perform high precision synchronization with the second electronic device.

In some embodiments, one type of wireless communication signal such as a WiFi signal can be used to transmit the three wireless communications above (as well as other communications) such as i) a WiFi broadcast signal, ii) marker data transmitted in a WiFi signal, and iii) a WiFi signal with a different frequency than an earlier WiFi transmission. In some embodiments, a combination of types of wireless communication signals may be used to transmit the three wireless communications, including but not limited to a WiFi signal, a radio frequency (RF) signal, an infrared (IR) frequency signal, a sound signal, a cellular signal, a light signal, etc., to name just some examples. For example, the wireless communications i) and ii) can be transmitted via WiFi signals, while an RF signal is used to transmit communication iii). In this example, an RF signal can be transmitted from the second electronic device where the frequency of the RF signal varies based on the marker data in wireless communication ii).

FIG. 1 illustrates an example system 100 implementing transmitters and receivers for high precision synchronization in a shared medium, in accordance with some embodiments of the disclosure. System 100 is provided for the purpose of illustration and is not limiting of the disclosed embodiments. System 100 includes television 110, speakers 120a-120f, smart remote 130, subwoofer 140, wireless communication device 150 (e.g., an application on a smart phone), and headphones 160 that share a wave-based medium. As mentioned above, the medium can be RF, IR, WiFi, light, sound waves, etc. In this example, television 110 is shown as a master device that transmits at least the following information on the shared wave-based medium: i) network-synchronization information: a network-based time stamp, and a corresponding accuracy of the network-based time stamp; ii) marker data such as but not limited to a rate of frequency change of a second signal; and iii) the second signal with a frequency change that is based on the rate of frequency change identified in the marker data.

In system 100, television 110 is shown as the master device, but in other examples, any of the electronic devices of system 100 can be the master device and the remaining electronic devices can be slave devices. Further, the arrangement may include more electronic devices or less electronic devices such as a single master device and a single slave device. In system 100, some embodiments enable the slave devices that share the wave-based medium (e.g., speakers 120a-120f, smart remote 130, subwoofer 140, wireless communication device 150, and headphones 160) to synchronize with a master device, television 110, with high precision. The high precision synchronization among the electronic devices in system 100 produces a desirable sound that users enjoy. Other devices that may benefit from some or all of the embodiments—which are not shown in FIG. 1 for simplicity purposes—may include other computing devices including but not limited to laptops, desktops, tablets, personal assistants, routers, monitors, as well as any other type of electronic computing device having wireless communication capability that can include communication via one or more wireless communication protocols such as used for communication including WiFi, network time protocol (NTP), HyperText Transfer Protocol (HTTP), or a proprietary protocol.

Figure 2:
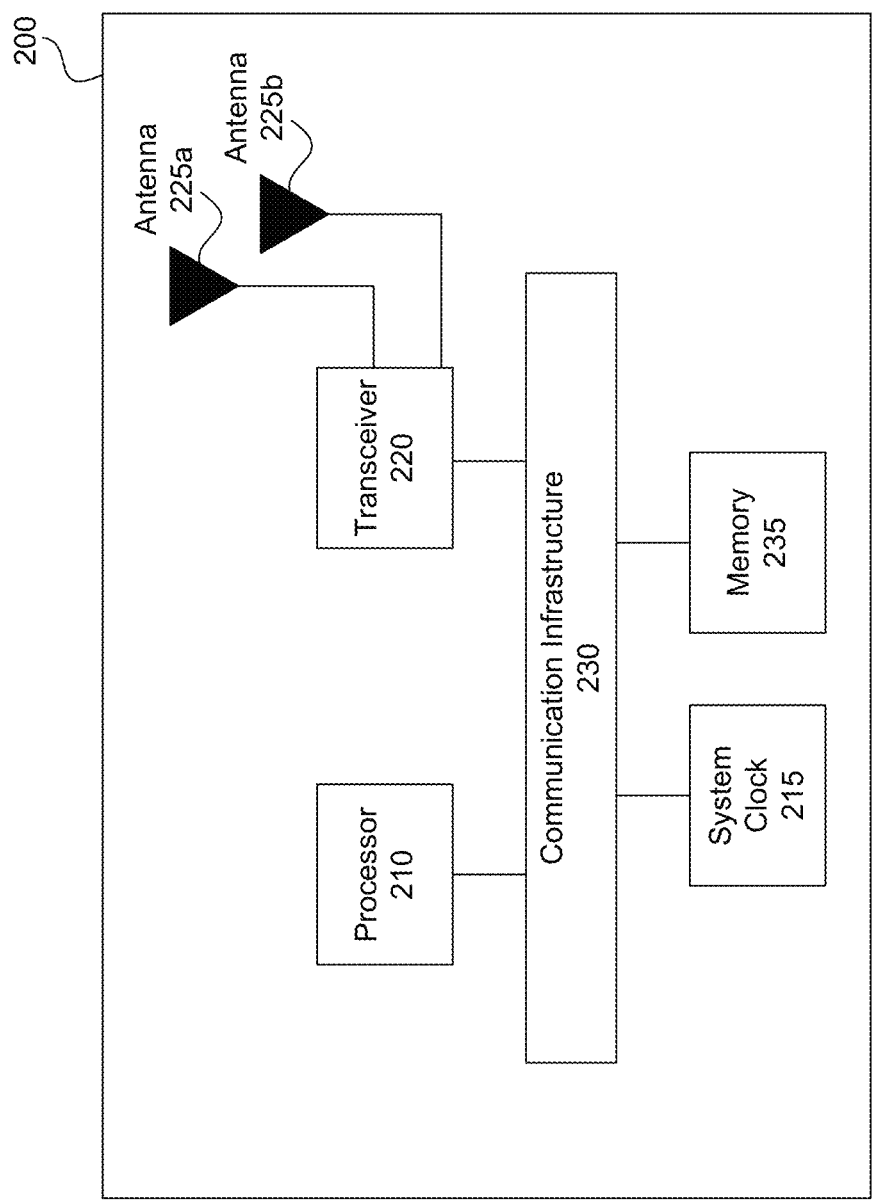
FIG. 2 illustrates a block diagram of an example wireless system with a transmitter for high precision synchronization, according to some embodiments of the disclosure.

FIG. 2 illustrates a block diagram of an example wireless system 200 with a transmitter (e.g., within transceiver 220) for high precision synchronization, according to some embodiments of the disclosure. As a convenience and not a limitation, FIG. 2, may be described with elements of FIG. 1. System 200 may be the master device, television 110, of system 100. System 200 may include processor 210, system clock 215, transceiver 220, communication infrastructure 230, memory 235, and one or more antennas 225 (e.g., 225a and 225b) that together perform operations enabling high precision synchronization in a shared medium. Transceiver 220 transmits and receives communications signals including RF, IR, WiFi, light, or sound signals for high precision synchronization, according to some embodiments, and may be coupled to one or more antennas 225 that may be the same or different types. Communication infrastructure 230 may be a bus. Memory 235 may include random access memory (RAM) and/or cache, and may include control logic (e.g., computer software) and/or data. System clock 215 can be a main clock for wireless system 200 or a separate clock. In some embodiments system clock 215 can be physical clock or a virtual clock (e.g., software instructions stored in memory 235 that are executed by processor 210. In some embodiments, system 200 transmits wireless communications i), ii), and iii) via antenna 225a (e.g., via WiFi signals.) In some embodiments, system 200 transmits wireless communications i), ii), and iii) via a combination of antennas 225a and 225b (e.g., transmit wireless communications i) and ii) via WiFi signals and antenna 225a, and transmit wireless communication iii) via RF signal and antenna 225b.) Other combinations that may include additional antennas 225 are possible.

In some embodiments, system 200 transmits network-synchronization information in wireless communications i) that are received by a slave device (e.g., system 300 below) for network-based synchronization with system 200 on the shared medium with a first synchronization. System 200 transmits marker data in wireless communications ii) that informs the slave device of a time marker that indicates when a second signal that system 200 subsequently transmits, will change from a first frequency to a second frequency. System 200 transmits the second signal in wireless communications iii) that is received by the slave device. The slave device can utilize the information from wireless communications i), ii), and iii) to synchronize with system 200 with a higher precision synchronization than the first synchronization. In some embodiments the first synchronization is in the order of milliseconds and the higher precision synchronization is in the order of hundreds of femtoseconds.

Figure 3:
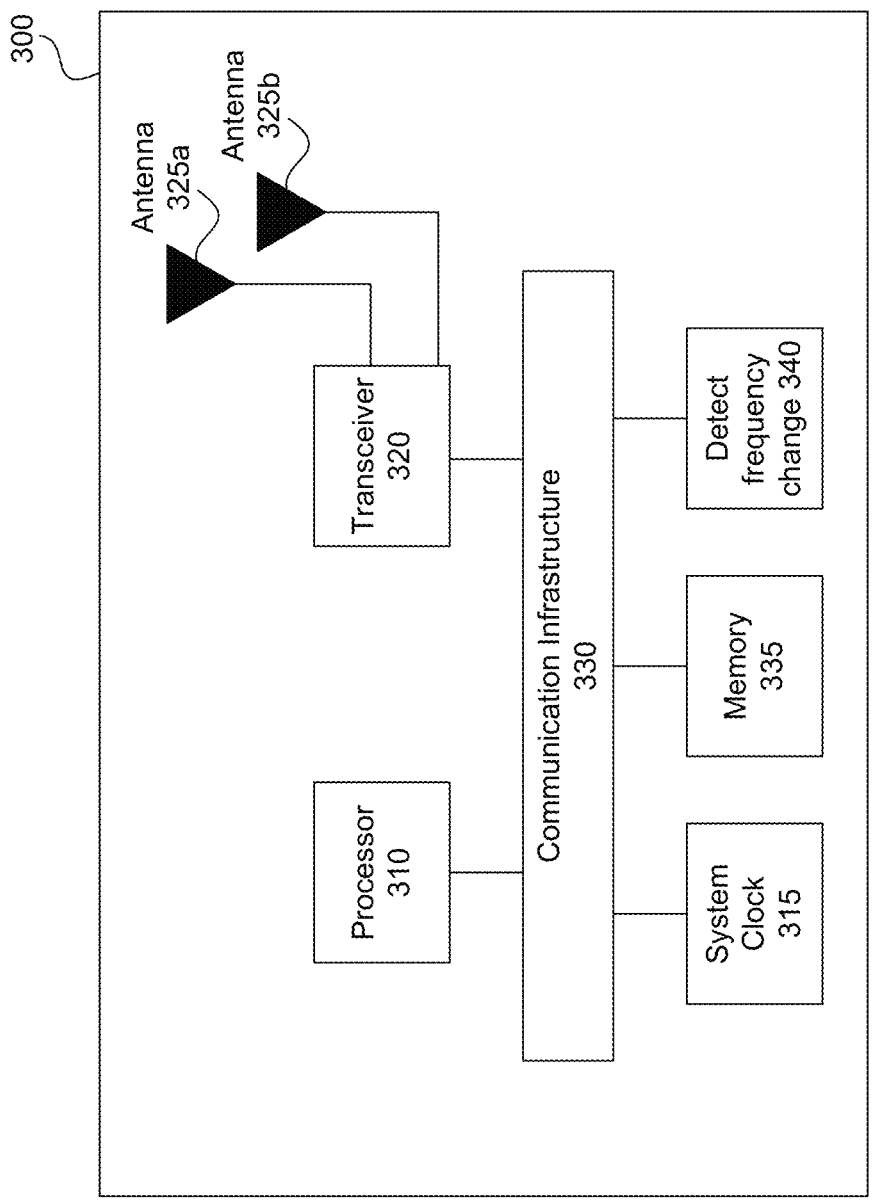
FIG. 3 illustrates a block diagram of an example wireless system with a receiver for high precision synchronization, according to some embodiments of the disclosure.

FIG. 3 illustrates a block diagram of an example wireless system with a receiver (e.g., within transceiver 320) for high precision synchronization, according to some embodiments of the disclosure. As a convenience and not a limitation, FIG. 3, may be described with elements of FIG. 1. System 300 may be any slave device of the electronic devices (e.g., speakers 120a-120f, smart remote 130, subwoofer 140, wireless communication device 150, or headphones 160) of system 100. System 300 may include processor 310, system clock 315, transceiver 320, communication infrastructure 330, memory 335, detect frequency change 340, and one or more antennas 325 (e.g., 325a and 325b) that together perform operations enabling high precision synchronization in a shared medium. Transceiver 320 receives and transmits communications signals including RF, IR, WiFi, light, or sound signals for high precision synchronization, according to some embodiments, via antennas 325a and/or 325b that may be of the same or different type.

Communication infrastructure 330 may be a bus. Memory 335 may include random access memory (RAM) and/or cache, and may include control logic (e.g., computer software) and/or data. System clock 315 can be a main clock for wireless system 300 or a separate clock. In some embodiments system clock 315 can be physical clock or a virtual clock (e.g., software instructions stored in memory 335 that are executed by processor 310. In some embodiments, detect frequency change 340 represents a machine learning algorithm performed by processor 310 (e.g., software instructions stored in memory 335 that are executed by processor 310) to determine a frequency change based on a given rate of frequency change. In some embodiments the machine learning algorithm comprises a convolutional neural network (CNN) or long short-term memory network (LSTM).

In some embodiments, detect frequency change 340 can be a phase locked loop (PLL) circuit that synchronizes on the phase of an incoming global signal and can detect the change of frequency of the incoming global signal with high precision synchronization in the order of hundreds of femtoseconds. Utilizing PLL synchronization in conjunction with network-based synchronization methods and marker data enables electronic devices in a shared medium to synchronize with higher precision synchronization than using network-based synchronization methods alone. In some embodiments a network-based synchronization, the first synchronization, is in the order of milliseconds and the combination of the network-based synchronization and PLL synchronization enables a higher precision synchronization in the order of hundreds of femtoseconds.

In some embodiments, system 300 receives wireless communications i), ii), and iii) via antenna 325a (e.g., via WiFi signals.) In some embodiments, system 300 receives wireless communications i), ii), and iii) via a combination of antennas 325a and 325b (e.g., receive wireless communications i) and ii) via WiFi signals and antenna 325a, and receives wireless communication iii) via RF signal and antenna 325b.) Other combinations that may include additional antennas 325 are possible. In some embodiments system 300 uses the network synchronization information from received wireless communications i) to synchronize with system 200 (e.g., a master device.) In some embodiments, system 300 utilizes the marker data from received wireless communications ii) to detect a frequency change in a second signal received, via detect frequency change 340 or machine learning algorithm performed by processor 310. Detecting the frequency change enables system 300 to determine a corresponding time marker. System 300 can update system clock 315 based at least on the corresponding time marker.

In some embodiments, detect frequency change 340 implemented as a PLL circuit can detect the frequency change of the second signal based on a change in frequency, amplitude, and/or the presence or absence of the second signal as described in FIG. 6 below. In some embodiments, detect frequency change 340 implemented as a PLL circuit can detect the frequency change of the second signal based on a PLL feedback graph (e.g., based algorithms that utilize signal saturation values, a start time delay, and/or an end time delay.) This is described in FIG. 7 below.

Figure 4:
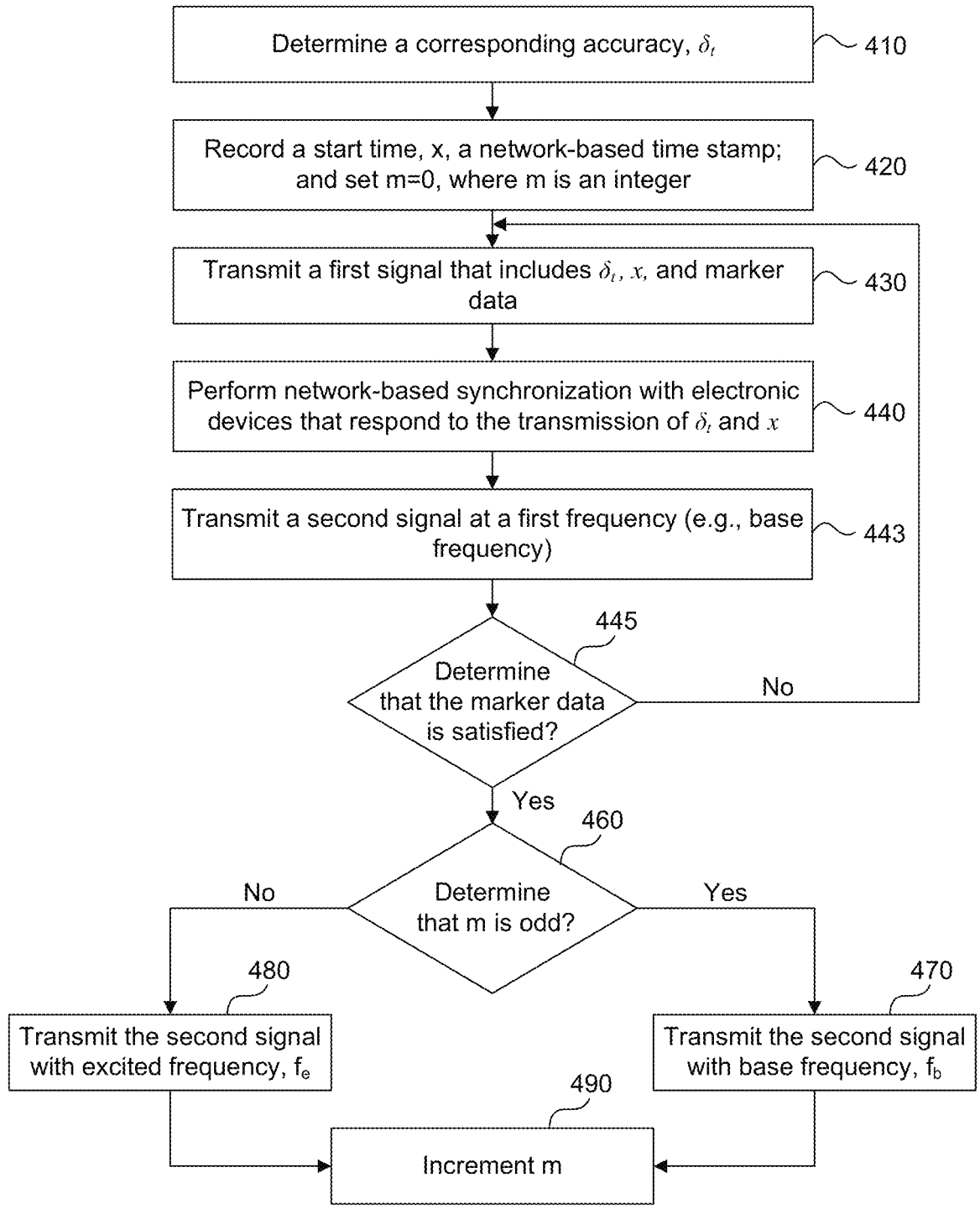
FIG. 4 illustrates a method for an example wireless system with a transmitter for high precision synchronization, according to some embodiments of the disclosure.

FIG. 4 illustrates a method 400 for an example wireless system 200 with a transmitter for high precision synchronization, according to some embodiments of the disclosure. As a convenience and not a limitation, FIG. 4, may be described with respect to elements of FIGS. 1-3. For example, method 400 can be performed by the master device, television 110, of system 100, or system 200 of FIG. 2. And system 200 can perform method 400 which includes transmitting information that can be received by system 300 of FIG. 3 (e.g., a slave device.)

At 410, method 400 determines a corresponding accuracy, $\delta_t$, of system clock 215.

At 420, method 400 records a start time, x, a master device's initial clock timestamp; and sets m=0, where m is an integer.

At 430, method 400 transmits network synchronization information (e.g., wireless communication i)) and marker data (e.g., wireless communication ii)) in a first signal. In some embodiments, method 400 transmits the marker data in conjunction with the network synchronization information (e.g., as parameters in a network synchronization signal, such as a WiFi beacon.) Network synchronization information can include the corresponding accuracy, $\delta_t$, and the network-based time stamp, x. For example, the first signal can be a network synchronization signal such as but not limited to, a WiFi beacon. Marker data is used to determine a time (e.g., a time marker) when the network synchronization method and the PLL synchronization method are used in conjunction to obtain a higher precision synchronization. In some embodiments the marker data is expressed as a rate of frequency change of a second signal that system 200 transmits. For example, the rate of frequency change can be expressed as:

$$x + \propto \cdot m \cdot \delta_t, \text{ where } \propto \text{ is a settable value greater than 2.} \quad \text{(Eq. 1)}$$

At 440, method 400 performs network-based synchronization with one or more electronic devices that respond to the transmission of $\delta_t$ and x. In other words, electronic devices that receive and respond to $\delta_t$ and x can synchronize with the master device (e.g., system 200) with a first synchronization (e.g., in the order of milliseconds.)

At 443, method 400 transmits a second signal at a first frequency (e.g., a base frequency, $f_b$).

At 445, method 400 determines whether the marker data is satisfied. When method 400 determines that the marker data is satisfied, $t = x + \propto \cdot m \cdot \delta_t$, where t indicates a time marker for system clock 215 and method 400 proceeds to 450. Otherwise, method 400 returns to 430. In other words, system 200 determines that when system clock 215 time satisfies the rate of frequency change, $t = x + \propto \cdot m \cdot \delta_t$, system 200 proceeds to change the frequency of the second signal to a different frequency. The time, t, associated with the change in frequency is the time marker.

Method 400 determines what frequency to change to, based for example on the value of m as described in 460, 470, 480, and 490 below.

At 460, method determines whether the value of m is even or odd. When m is odd, method 400 proceeds to 470. When m is even, method 400 proceeds to 480.

At 470, when m is odd, method 400 changes the frequency of the second signal (e.g., transmits the second signal with a base frequency, $f_b$.) For example, at the time, t, that corresponds to the time marker, method 400 changes the frequency of the second signal from an excited frequency, $f_e$, to $f_b$.

At 490, method 400 increments the value of m.

Returning to 480, when m is even, method 400 changes the frequency of the second signal (e.g., transmits the second signal with an excited frequency, $f_e$.) For example, at the time, t, that corresponds to the time marker, method 400 changes the frequency of the second signal from a base frequency, $f_b$ to $f_e$. Method 400 proceeds to 490.

In some embodiments, the transmitted second signal at 443 can be a global signal transmitted at a base frequency, $f_b$, and the marker data being satisfied at 445 causes system 200 to transmit the global signal with a different frequency at 480, an excited frequency, $f_e$. A system 300 of FIG. 3 (e.g., slave device) that received the marker data at 430 can use a phase locked loop (PLL) circuit (e.g., detect frequency change 340 of system 300) to synchronize on the phase of the incoming global signal at 443 and then at 480 to detect the change of frequency from $f_b$ to $f_e$ or vice versa. The higher precision synchronization can be in the order of hundreds of femtoseconds. In some embodiments, the global signal is a WiFi signal and the change of frequency occurs in the WiFi signal. In some embodiments the global signal is another communication type including but not limited to a radio frequency (RF) signal, an infrared (IR) frequency signal, a sound signal, or a light signal.

In some embodiments, method 400 utilizes one type of communication (e.g., WiFi signals) to implement 430, 435, and 450. In some embodiments, method 400 utilizes a combination of types of communication (e.g., WiFi and RF) to implement 430 and 450. For example, method 400 utilizes WiFi signals to implement 430, while utilizing RF signals to implement 450 and subsequently 470 and/or 480.

Figure 5:
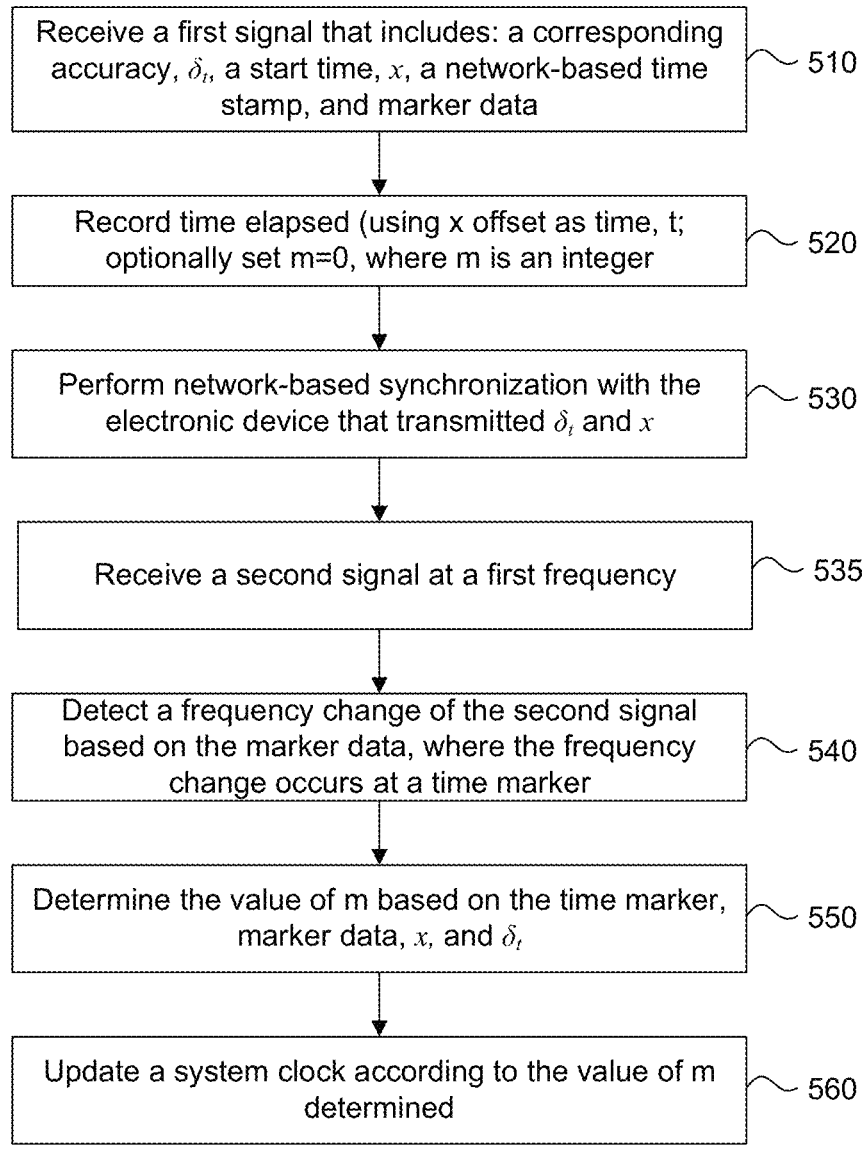
FIG. 5 illustrates a method for an example wireless system with a receiver for high precision synchronization, according to some embodiments of the disclosure.

FIG. 5 illustrates a method 500 for an example wireless system 300 with a receiver for high precision synchronization, according to some embodiments of the disclosure. As a convenience and not a limitation, FIG. 5, may be described with elements of FIGS. 1-3. For example, method 500 can be performed by slave devices that share the wave-based medium (e.g., speakers 120a-120f, smart remote 130, subwoofer 140, wireless communication device 150, and headphones 160 of system 100 of FIG. 1), or system 300 of FIG. 3. And system 300 can perform method 500 which includes transmitting information that can be received by system 200 of FIG. 2 (e.g., a master device.)

At 510, method 500 receives a first signal that includes: a corresponding accuracy, $\delta_t$, a start time, x, a network-based time stamp (e.g., network synchronization information via wireless communications i)), as well as marker data (e.g., wireless communications ii).) The first signal can be a WiFi signal, a radio frequency (RF) signal, an infrared (IR) frequency signal, a sound signal, or a light signal. In an example, method 500 receives a first signal such as a WiFi beacon signal that includes the corresponding accuracy, $\delta_t$, the start time, x, and the marker data. In some embodiments, method 500 receives receive a WiFi beacon signal that includes the corresponding accuracy, $\delta_t$, the start time, x, and the marker data, and the WiFi beacon signal is transmitted at a base frequency, $f_b$.

At 520, method 500 records time elapsed (using x offset) as time, t; and optionally sets m=0, where m is an integer.

At 530, method 500 performs network-based synchronization with the electronic device (e.g., master device or system 200 of FIG. 2) that transmitted $\delta_t$ and x. The network-based synchronization process can yield a first synchronization.

At 535, method 500 receives a second signal at a first frequency (e.g., $f_b$.)

At 540, method 500 receives the second signal (e.g., wireless communications iii)), and utilizes the marker data received to detect a frequency change of the second signal based. The frequency change occurs at a time marker, t. In some embodiments, the second signal is of the same communication type as 510 (e.g., the first signal at 510 and second signal at 535 and 540 can be be WiFi signals received at antenna 325*a*.) In some embodiments, the first signal and second signal are of a different communication type. For example, the first signal at 510 can be a WiFi signal received at antenna 325*a*, and the second signal at 535 and 540 can be an RF signals received at antenna 325*b*.) FIG. 6 is introduced to illustrate the time marker's relationship with the network synchronization method and the PLL synchronization method to obtain higher precision synchronization.

Figure 6:
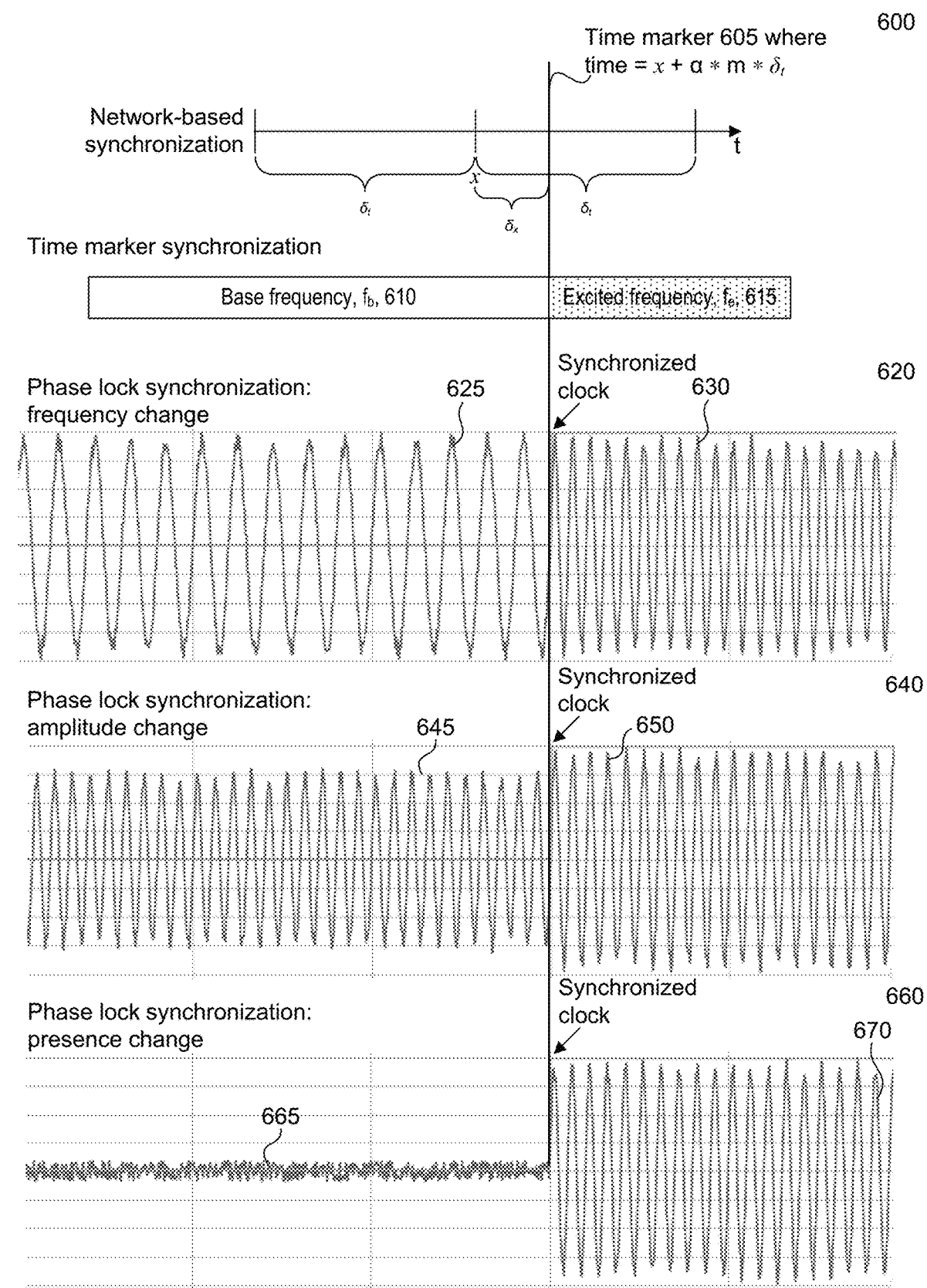
FIG. 6 illustrates examples of detecting a time marker by receiver for high precision synchronization, according to some embodiments of the disclosure.

FIG. 6 illustrates examples of detecting a time marker by receiver (e.g., transceiver 320 of system 300 of FIG. 3) for high precision synchronization, according to some embodiments of the disclosure. As a convenience and not a limitation, FIG. 6, may be described with elements of FIGS. 1-5. Example 600 illustrates a combination of a network-based synchronization and a secondary synchronization method, PLL synchronization, for high precision synchronization for system 300 (e.g., a slave device) on a timeline. Recall that system 300 receives network synchronization information and marker data at 510 of FIG. 5 (e.g., wireless communications i) and ii)): corresponding accuracy, $\delta_t$, the start time, x, the master device's initial clock timestamp, the time marker that indicates when system 200 (e.g., the master device) changes the frequency of a subsequent second signal (e.g., wireless communication iii)). The time in which the frequency of the second signal is changed is represented by time marker 605 of FIG. 6, that indicates a time, t, where t=x+∝·m·$\delta_t$ on system clock 215, where ∝ is a constant, a settable value greater than 2. The time between the start time x and time marker 605 is noted as $\delta_x$, a relative accuracy.

As shown at 540 of FIG. 5, system 300 receives and detects a change in frequency at the PLL circuit (e.g., detect frequency change 340 of FIG. 3) at time marker 605. Example 600, illustrates the change from base frequency 610, $f_b$, to excited frequency 615, $f_e$, at time marker 605. Accordingly, system 300 knows that the time on the master clock, system clock 215, has reached t=x+∝·m·$\delta_t$, for some value of m. System 300 knows that at that the same time, t, system clock 315 of system 300 (e.g., slave device) is equal to t=x+∝·m·$\delta_t$+$\delta_x$, where $-\delta_t \leq \delta_x \leq \delta_t$. The relative accuracy, $\delta_x$, is due to the inherent inaccuracy of the network-synchronization method. System 300 calculates the correct value of m.

Since $|\delta_x| \leq \delta_t$, m can be determined as follows:

$$\frac{t-x-\delta_t}{\propto \delta_t} \leq m \leq \frac{t-x+\delta_t}{\propto \delta_t} \quad \text{(Eq. 2)}$$

From $|\delta_x| \leq \delta_t$ it follows that $$|\delta_x/(\propto \delta_t)| \leq 1/(\propto) \quad \text{(Eq. 3)}$$

Thus, the first electronic device (e.g., slave device) can derive m from $$m = \left\lfloor \frac{t-x}{\propto \delta_t} + 1/\propto \right\rfloor. \quad \text{(Eq. 4)}$$

Thus, system 300 can use the value of m to adjust system clock 315 to the same value as system clock 215 (e.g., the master device's clock) within an inaccuracy in the order of hundreds femtoseconds, a higher precision synchronization than the first synchronization in the order of milliseconds.

Returning to FIG. 5 at 550, method 500 determines the value of m based at least on the time marker, marker data, $\delta_t$, and x. For example, method 500 utilizes the marker data, t=x+∝·m·$\delta_t$, where ∝ is a settable value greater than 2, to determine a higher precision synchronization with system 200, where the higher precision synchronization is improved over the first synchronization at 530. In an embodiment, the first synchronization is in the order of milliseconds and the higher precision synchronization is in the order of hundreds of femtoseconds.

At 560, method 500 updates system clock 315 based on the value of m determined, with the higher precision synchronization determined at 550.

As described above, detect frequency change 340 of FIG. 3 can be implemented by a PLL circuit. Remaining examples 620, 640, and 660 of FIG. 6 respectively, illustrate phase lock synchronizations for changes in the frequency, amplitude, and presence of a second signal (e.g., wireless communication iii)) received. Example 620 illustrates phase lock synchronization for a frequency change from signal 625 to signal 630 at time marker 605 (e.g., sine wave, Bluetooth frequency hopping.) Example 640 illustrates phase lock synchronization for an amplitude change from signal 645 to signal 650 at time marker 605. Example 660 illustrates phase lock synchronization for a presence change from no signal 665 to signal 670 at time marker 605 (e.g., an intermittent WiFi beacon signal, or a sound signal to silence.)

In some embodiments a transmitter of system 200 (e.g., a master device) transmits the data that includes a known number of wave pulses, m, of the second signal, to detect the frequency change of the second signal. Subsequent to updating the clock of system 300 (e.g., a slave device), system 300 counts a number of wave pulses of the second signal received, and determines that the count satisfies m, the known number of wave pulses. System 300 determines a second time marker corresponding to the m count being satisfied, and updates the clock of the first electronic device based at least on the second time marker.

In some embodiments, the known number of wave pulses, m, of the second signal is encoded with an amplitude change of the second signal, and system 300 (e.g., processor 310) is configured to detect the amplitude change of the second signal, and determine a time corresponding to the amplitude change detected, as the second time marker.

Figure 7:
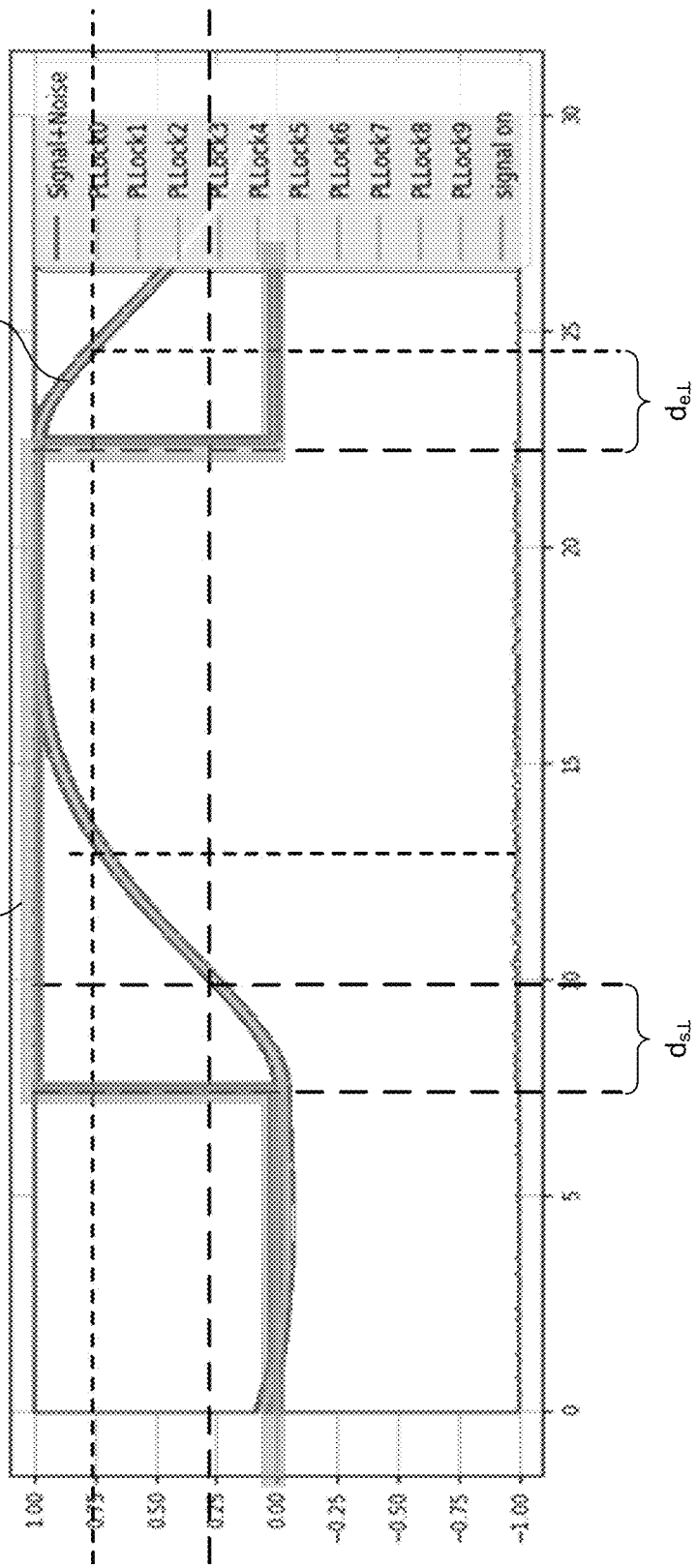
FIG. 7 illustrates another example of detecting a time marker by receiver for high precision synchronization, according to some embodiments of the disclosure.

FIG. 7 illustrates another example 700 of detecting a time marker by receiver (e.g., transceiver 320 of system 300 of FIG. 3) for high precision synchronization, according to some embodiments of the disclosure. In some embodiments a slope of a PLL saturation graph can be used to predict the start of a second signal or the end of a second signal even in the presence of noise. Example 700 illustrates the ideal frequency change signal 720 from base frequency, $f_b$, to excited frequency, $f_e$, and the actual frequency change signal 710. While the PLL signal response varies as the second signal changes from PLL=0 to saturation at PLL=1, the start time delay, $d_{s1}$, and the end time delay, $d_{e1}$, are the same during each change, even in the presence of noise. Thus, $d_{s1}$ (or $d_{e1}$) are characteristic values for the PLL and can be measured in advance (e.g., measured on the device before the time synchronization is attempted.) For example, $d_{s1}$ illustrates the delay from the onset of $f_e$ until the saturation graph reaches 0.25. To use $d_{s1}$ to obtain a high precision estimate of the master timestamp, system 300 (e.g., slave device) can perform the following:

1. Record a state of the frequency (e.g., $f=f_b$); in this example there are two frequencies, $f_b$ and $f_e$.
2. Determine that the saturation graph reaches 0.20, that the frequency may be changing, at time, t.
3. Determine when the saturation graph reaches 0.25, that the time, t', indicates the start time delay, $d_{s1}$, and record the $d_{s1}$.
4. Calculate time, $t=t'-d_{s1}$. And the value of m to adjust system clock 315 to the same value as system clock 215 (e.g., the master device's clock) within an inaccuracy in the order of hundreds femtoseconds can be determined using Eq. 4 above (e.g., inserting $t'-d_{s1}$ as t in Eq. 4 above.)

This example description details how to use $d_{s1}$ to obtain t for Eq. 4. In another embodiment a similar process occurs for the end time delay, $d_{e1}$.

Figure 8:
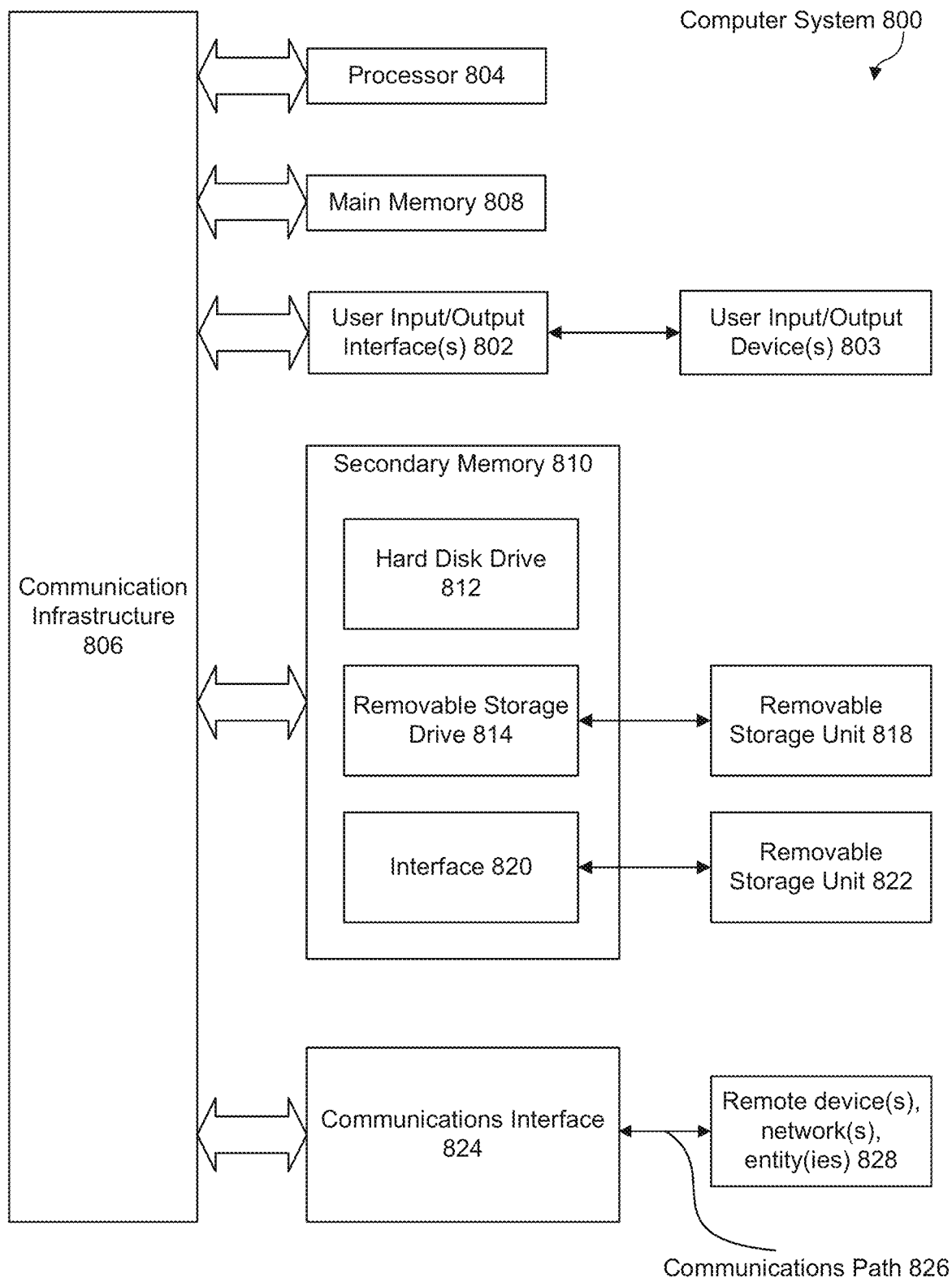
FIG. 8 is an example computer system for implementing some embodiments or portion(s) thereof.

Various embodiments can be implemented, for example, using one or more computer systems, such as computer system 800 shown in FIG. 8. Computer system 800 can be any well-known computer capable of performing the functions described herein. For example, and without limitation, electronic devices such as laptops, desktops as described with regard to FIG. 1 and/or other apparatuses and/or components shown in the figures. For example, computer system 800 can be used in wireless devices to exchange data that enable high precision synchronization among electronic devices in a shared medium.

Computer system 800 includes one or more processors (also called central processing units, or CPUs), such as a processor 804. Processor 804 is connected to a communication infrastructure or bus 806. Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture includes a tangible computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A first electronic device, comprising:
   a transceiver configured to receive wireless communications over a shared medium from a second electronic device;
   a processor, coupled to the transceiver, configured to:
      receive a first signal via the shared medium comprising data: a network-based time stamp, a corresponding accuracy of the network-based time stamp, and marker data;
      perform network-based synchronization with the second electronic device based on the network-based time stamp and the corresponding accuracy of the network-based time stamp, to synchronize a first clock of the first electronic device to a second clock of the second electronic device within the corresponding accuracy of the network-based time stamp;
      receive a second signal at a first frequency;
      detect, via a phase lock loop (PLL) circuit coupled to the processor, a frequency change of the second signal based on the marker data, wherein the frequency change of the second signal identifies a first time marker;
      determine a relative accuracy based at least on the first time marker, the marker data, the network-based time stamp, and the corresponding accuracy of the network-based time stamp; and
      update the first clock based at least on the relative accuracy.

2. The first electronic device of claim 1, wherein the first time marker is a time, t, the first clock indicates $t=x+\alpha \cdot m \cdot \delta_t + \delta_x$, where $\delta_x$ is the relative accuracy, and $-\delta_t = \langle \delta_x = \langle \delta_t$, where x is the network-based time stamp, $\delta_t$ is the corresponding accuracy of the network-based time stamp, $\alpha$ is a settable value greater than 2, and m is an integer; and
   wherein the second clock indicates $t=x+\alpha \cdot m \cdot \delta_t$, for some value of m.

3. The first electronic device of claim 1, wherein the PLL circuit performs PLL synchronization based on a frequency change, amplitude change, or a presence change of the second signal.

4. The first electronic device of claim 3, wherein the frequency change is based on frequency hopping.

5. The first electronic device of claim 1, wherein the marker data comprises a known . number of wave pulses, m, of the second signal, and to detect the frequency change of the second signal, the processor is further configured to:
   subsequent to updating the first clock, count a number of wave pulses of the second signal received;
   determine that the count satisfies m;
   determine a second time marker corresponding to the m count being satisfied; and
   update the first clock based at least on the second time marker.

6. The first electronic device of claim 1, wherein the first signal comprises: a WiFi signal, a radio frequency (RF) signal, an infrared (IR) frequency signal, a sound signal, or a light signal.

7. The first electronic device of claim 6, wherein the first signal comprises a WiFi synchronization beacon signal.

8. The first electronic device of claim 1, wherein the first signal is a different type of signal than the second signal.

9. The first electronic device of claim 1, wherein the first signal is a same type of signal as the second signal.

10. A non-transitory computer-readable medium storing instructions that, when executed by a processor of a first electronic device, cause the processor to perform operations, the operations comprising:
   receiving from a second electronic device, a first signal comprising data: a network-based time stamp, a corresponding accuracy of the network-based time stamp, and marker data;
   performing network-based synchronization with the second electronic device based on the network-based time stamp and the corresponding accuracy of the network-based time stamp, to synchronize a first clock of the first electronic device to a second clock of the second electronic device within the corresponding accuracy of the network-based time stamp;
   receiving a second signal at a first frequency;
   detecting, via phase lock loop (PLL) synchronization, a frequency change of the second signal based on the marker data, wherein the frequency change of the second signal identifies a time marker;
   determining a relative accuracy based at least on the first time marker, the marker data, the network-based time stamp, and the corresponding accuracy of the network-based time stamp; and
   updating the first clock based at least on the relative accuracy.

11. The non-transitory computer-readable medium of claim 10, wherein the first time marker is a time, t, the first clock indicates $t=x+\alpha \cdot m \cdot \delta_t + \delta_x$, where $\delta_x$ is the relative accuracy, and $-\delta_t = \langle \delta_x = \langle \delta_t$, where x is the network-based time stamp, $\delta t$ is the corresponding accuracy of the network-based time stamp, $\alpha$ is a settable value greater than 2, and m is an integer; and
   wherein the second clock indicates $t=x+\alpha \cdot m \cdot \delta_t$, for some value of m.

12. The non-transitory computer-readable medium of claim 10, wherein the PLL synchronization is based on a frequency change, amplitude change, or a presence change of the second signal.

13. The non-transitory computer-readable medium of claim 12, wherein the frequency change is based on frequency hopping.

14. The non-transitory computer-readable medium of claim 10, wherein the marker data comprises a known number of wave pulses, m, of the second signal, and the detecting the frequency change of the second signal operation comprises:
  subsequent to updating the first clock, counting a number of wave pulses of the second signal received;
  determining that the count satisfies m;
  determining a second time marker corresponding to the m count being satisfied; and
  updating the first clock based at least on the second time marker.

15. The non-transitory computer-readable medium of claim 10, wherein the detecting the frequency change of the second signal operation comprises implementing a machine learning algorithm comprising a convolutional neural network (CNN) or long short-term memory network (LSTM).

16. The non-transitory computer-readable medium of claim 10, wherein the operations further comprise using a subsequent frequency change as a heartbeat for the first clock.

17. A method for a first electronic device comprising:
  transmitting a first signal over a shared medium, wherein the first signal comprises network synchronization data and marker data;
  transmitting a second signal on a first frequency;
  performing network-based synchronization with a second electronic device, wherein a clock of the second electronic device is updated based on the network synchronization data, wherein the network synchronization data comprises: a network-based time stamp, x, and a corresponding accuracy of the network-based time stamp, $\delta_t$;
  wherein the marker data comprises: a rate of frequency change of the second signal comprising:

$$x + \alpha \cdot m \cdot \delta_t,$$

where $\alpha$ is a settable value greater than 2, and m is an integer;
  determining that the marker data is satisfied at a time marker; and
  based on the determination, transmitting the second signal on second frequency, where the second frequency is different than the first frequency,
  wherein the second electronic device detects a frequency change of the second signal, and updates the clock of the second electronic device based on: the time marker, the network synchronization data, and the marker data.

18. The method of claim 17, further comprising:
  determining that m is not an odd value;
  in response to m being an even value, changing the frequency of the second signal to the second frequency; and
  incrementing m.

19. The method of claim 17, further comprising:
  determining that m is an odd value;
  in response to m being an odd value, changing the frequency of the second signal to the first frequency; and
  incrementing m.

* * * * *